(12) United States Patent
deCler

(10) Patent No.: US 6,902,144 B2
(45) Date of Patent: Jun. 7, 2005

(54) CONNECTOR APPARATUS WITH SEAL PROTECTOR AND METHOD OF THE SAME

(75) Inventor: Charles Peter deCler, Stillwater, MN (US)

(73) Assignee: Colder Products Company, St. Paul, MN (US)

( * ) Notice: Subject to any disclaimer, the term of this patent is extended or adjusted under 35 U.S.C. 154(b) by 135 days.

(21) Appl. No.: 10/340,764

(22) Filed: Jan. 10, 2003

(65) Prior Publication Data

US 2004/0135111 A1 Jul. 15, 2004

(51) Int. Cl.[7] .................................................. F16L 37/28
(52) U.S. Cl. .................................... 251/149.8; 251/353
(58) Field of Search ................................ 251/340, 341, 251/343, 344, 347, 349, 353, 149.1, 149.8, 149.9; 137/614.06; 222/505, 511, 518; 141/346, 347

(56) References Cited

U.S. PATENT DOCUMENTS

| | | | | |
|---|---|---|---|---|
| 2,485,006 A | * | 10/1949 | Main, Jr et al. | ......... 137/614.03 |
| 2,690,895 A | * | 10/1954 | Barcus | ....................... 251/353 |
| 3,294,118 A | * | 12/1966 | Wieden et al. | ............... 251/354 |
| 4,190,231 A | * | 2/1980 | Vimercati | .................... 251/353 |
| 4,314,689 A | * | 2/1982 | Wilson | ........................ 251/353 |
| 4,757,919 A | * | 7/1988 | Smazik et al. | ............... 222/518 |
| 4,991,821 A | * | 2/1991 | Beaston | .................... 251/149.8 |
| 5,002,254 A | * | 3/1991 | Belisaire et al. | ......... 251/149.8 |
| 5,433,410 A | * | 7/1995 | Foltz | ........................... 251/353 |
| 5,535,985 A | * | 7/1996 | Larbuisson | ............... 251/149.9 |
| 5,609,195 A | * | 3/1997 | Stricklin et al. | ............. 141/346 |
| 5,794,823 A | * | 8/1998 | Roundtree | ................... 222/518 |
| 6,041,805 A | * | 3/2000 | Gydesen et al. | ....... 137/614.04 |
| 2002/0129858 A1 | | 9/2002 | Meyer et al. | |

FOREIGN PATENT DOCUMENTS

| | | |
|---|---|---|
| DE | 736 348 C | 6/1943 |
| FR | 1 397 730 A | 4/1965 |
| FR | 1 488 386 A | 7/1967 |

OTHER PUBLICATIONS

International Search Report dated Jun. 9, 2004.

\* cited by examiner

*Primary Examiner*—Eric Keasel
(74) *Attorney, Agent, or Firm*—Merchant & Gould P.C.

(57) ABSTRACT

A connector apparatus having a coupler and a mating valve telescopically connected with the coupler. A planar member is disposed on the coupler within an outlet that is transverse to the inserting direction of the mating valve into the coupler. The planar member protects a sealing member that is disposed on the mating valve when the mating valve passes by the transverse outlet during opening or a closing of the connector apparatus.

7 Claims, 19 Drawing Sheets

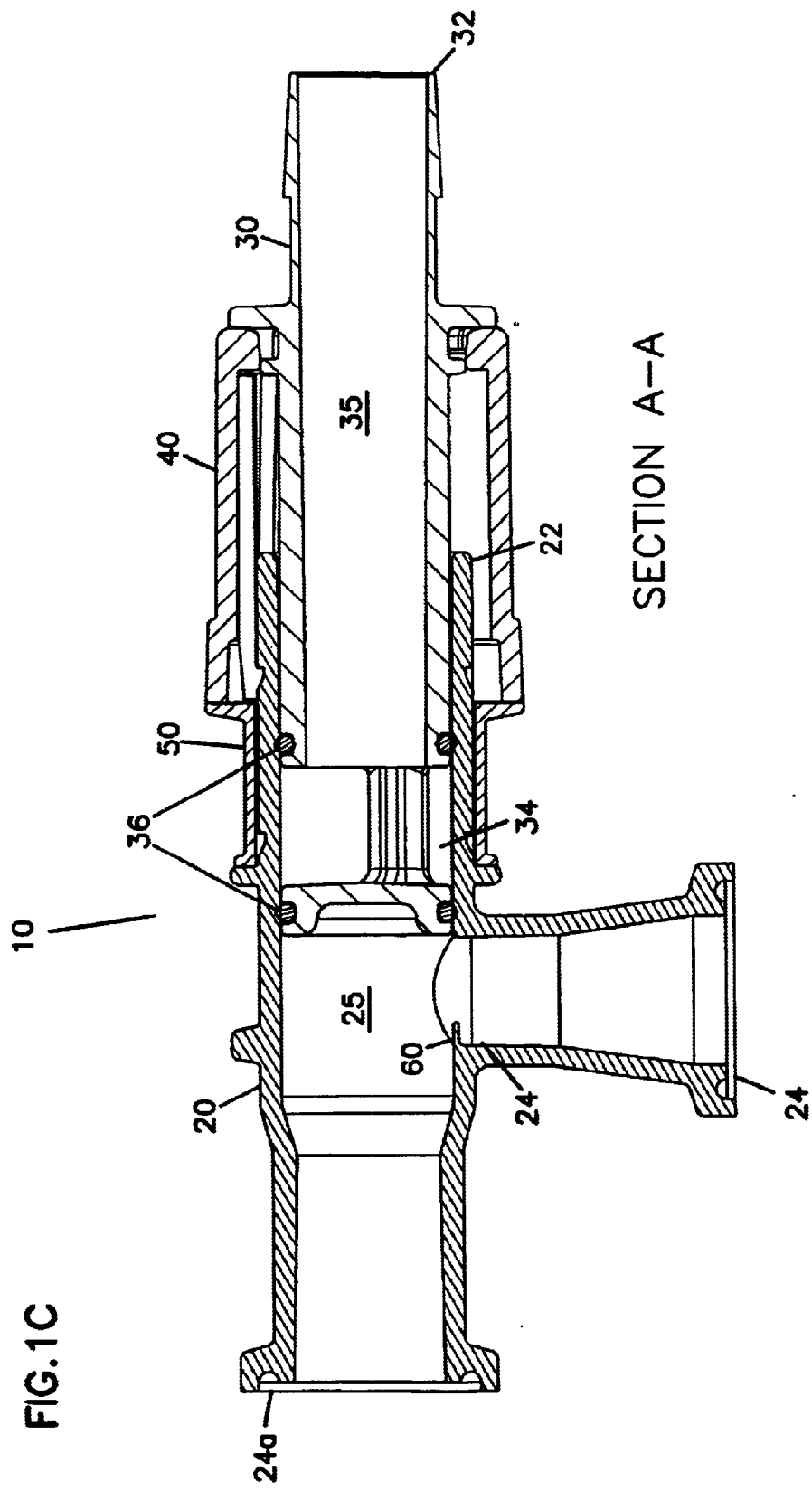

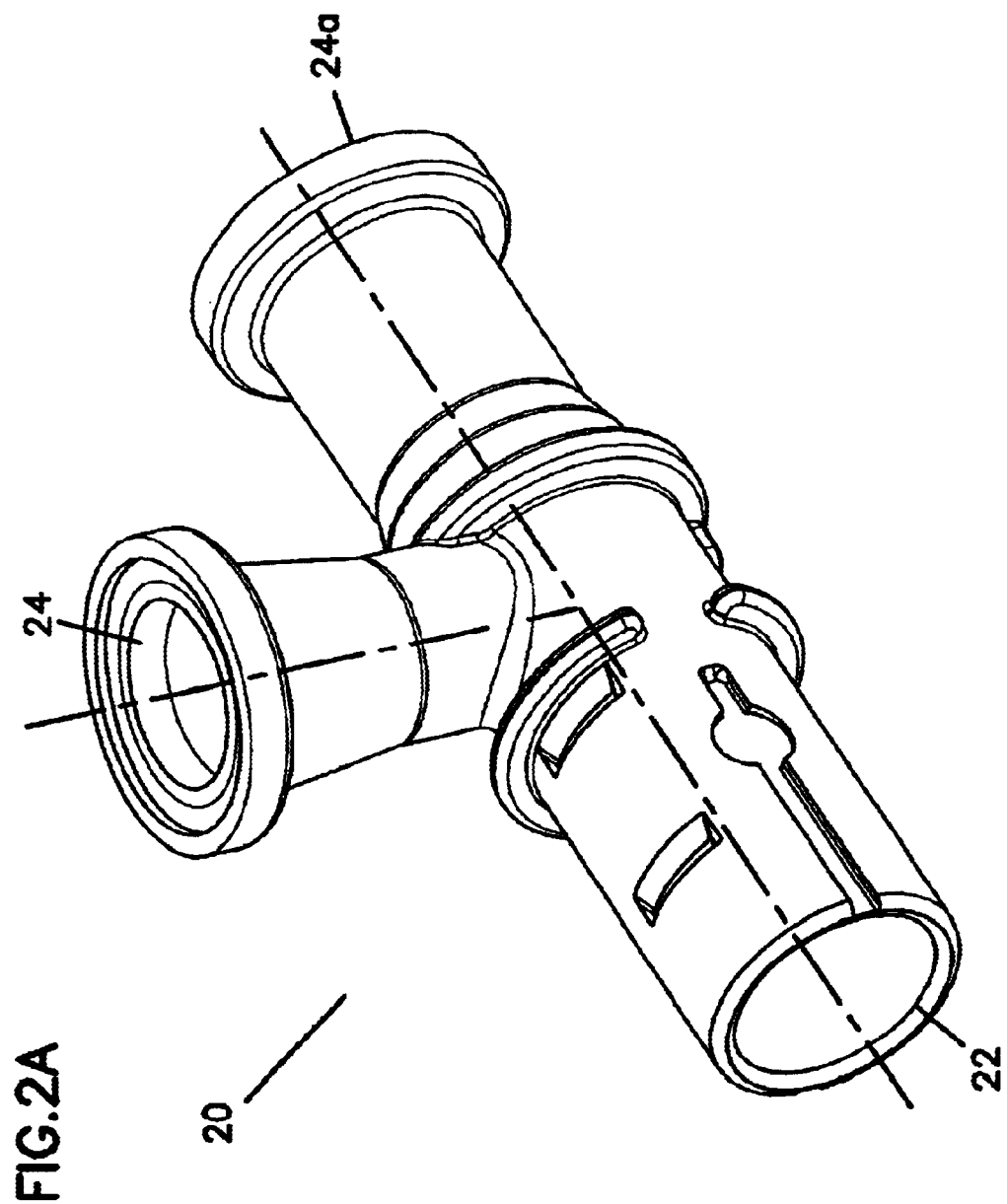

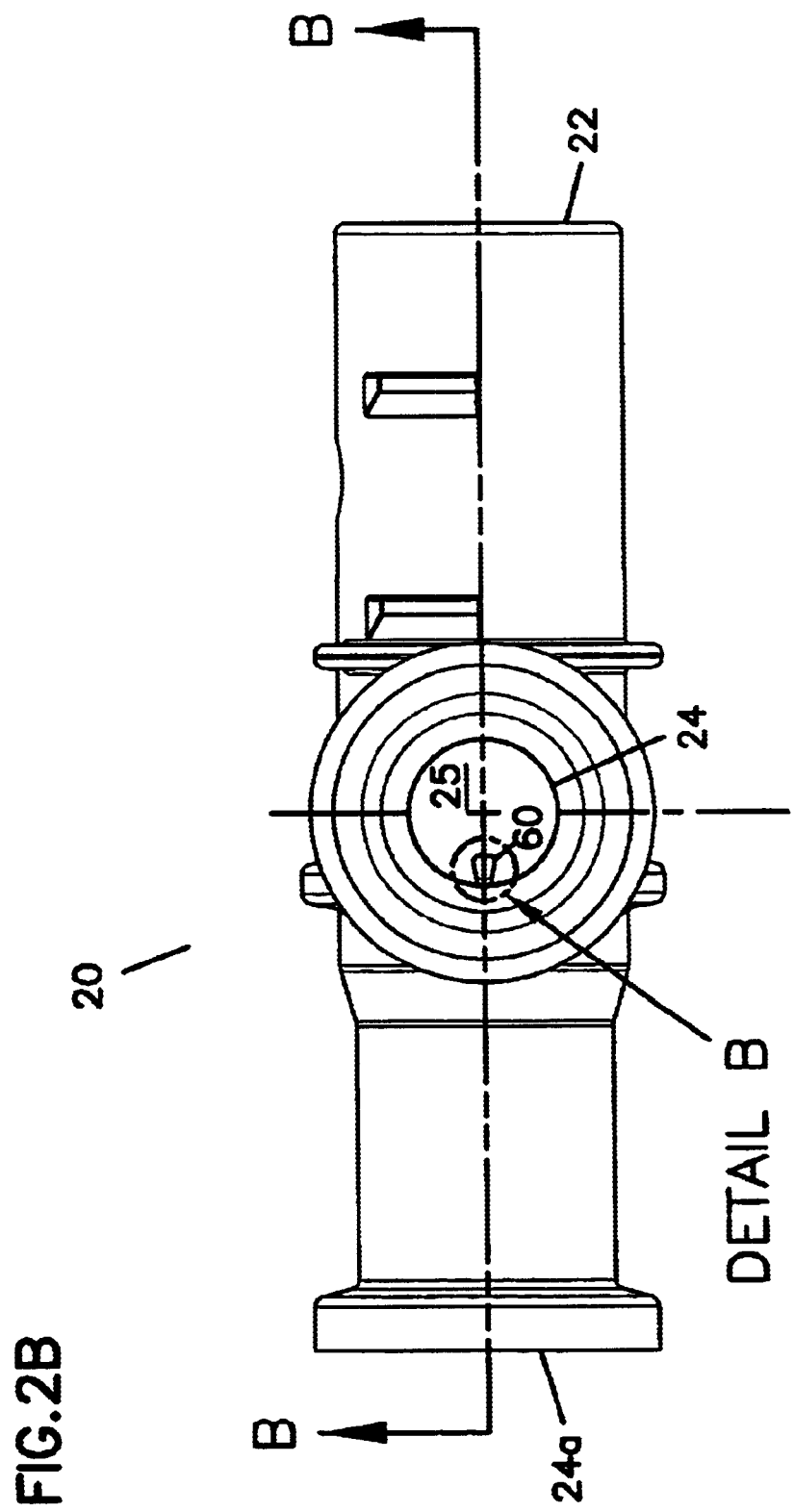

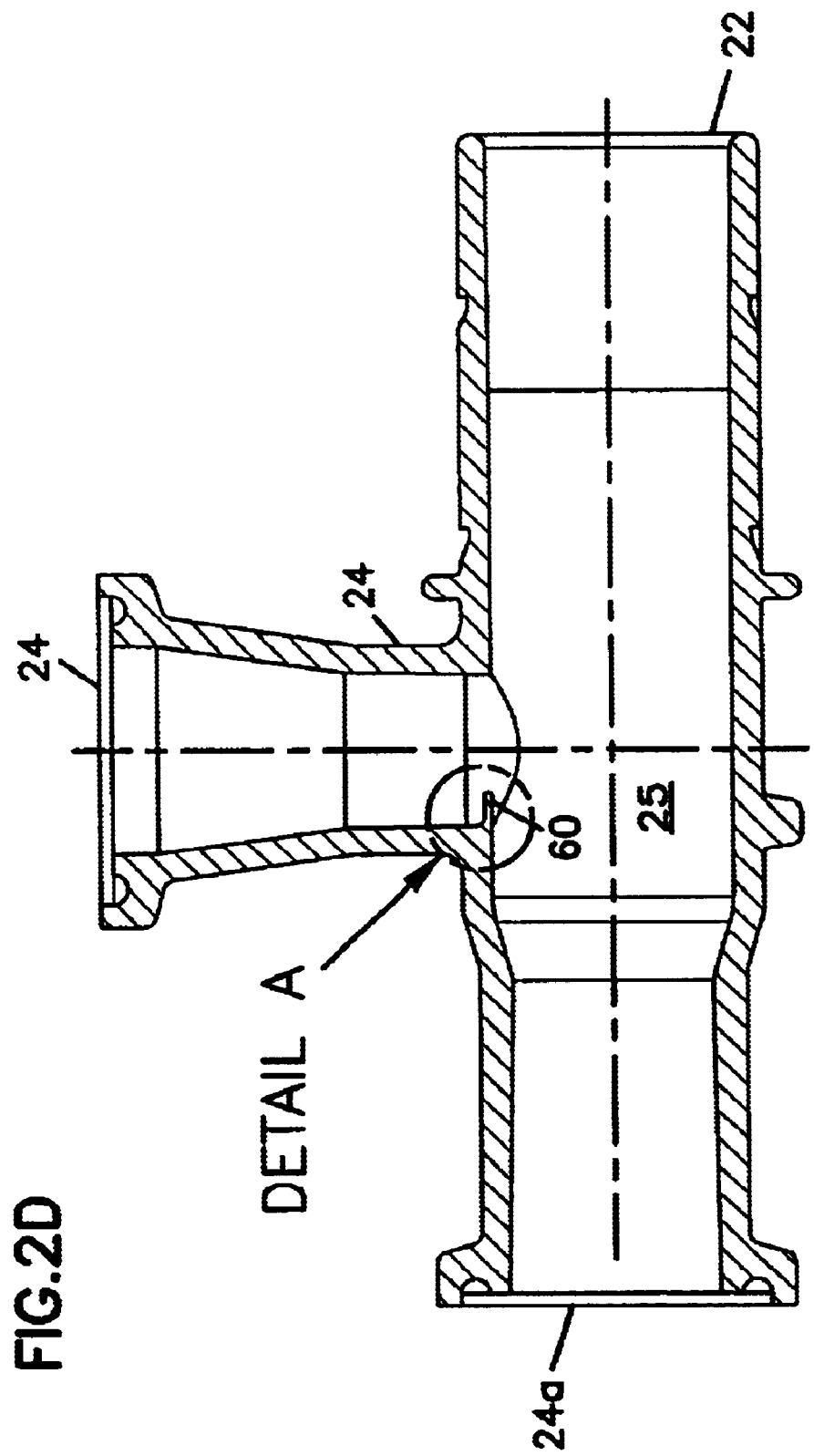

DETAIL B

DETAIL A

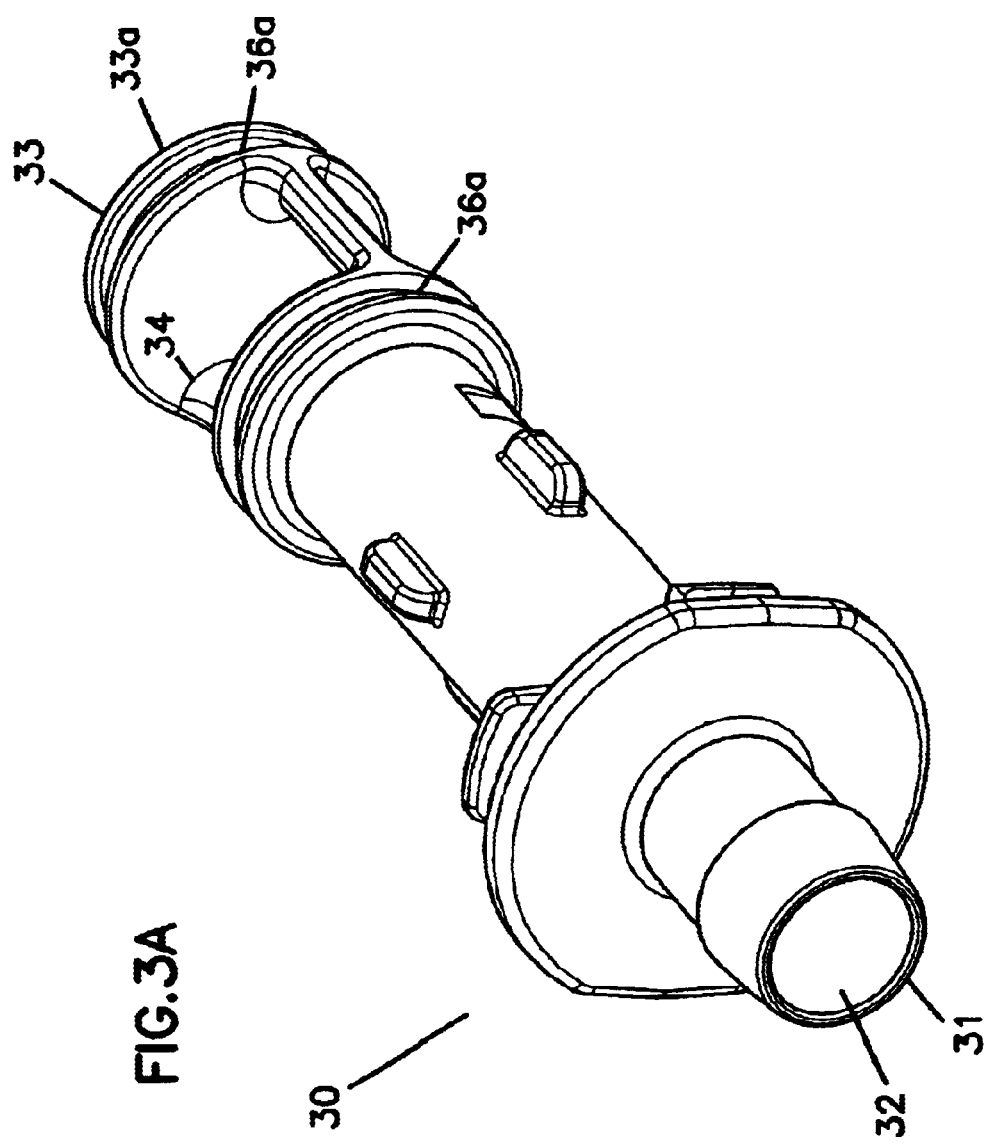

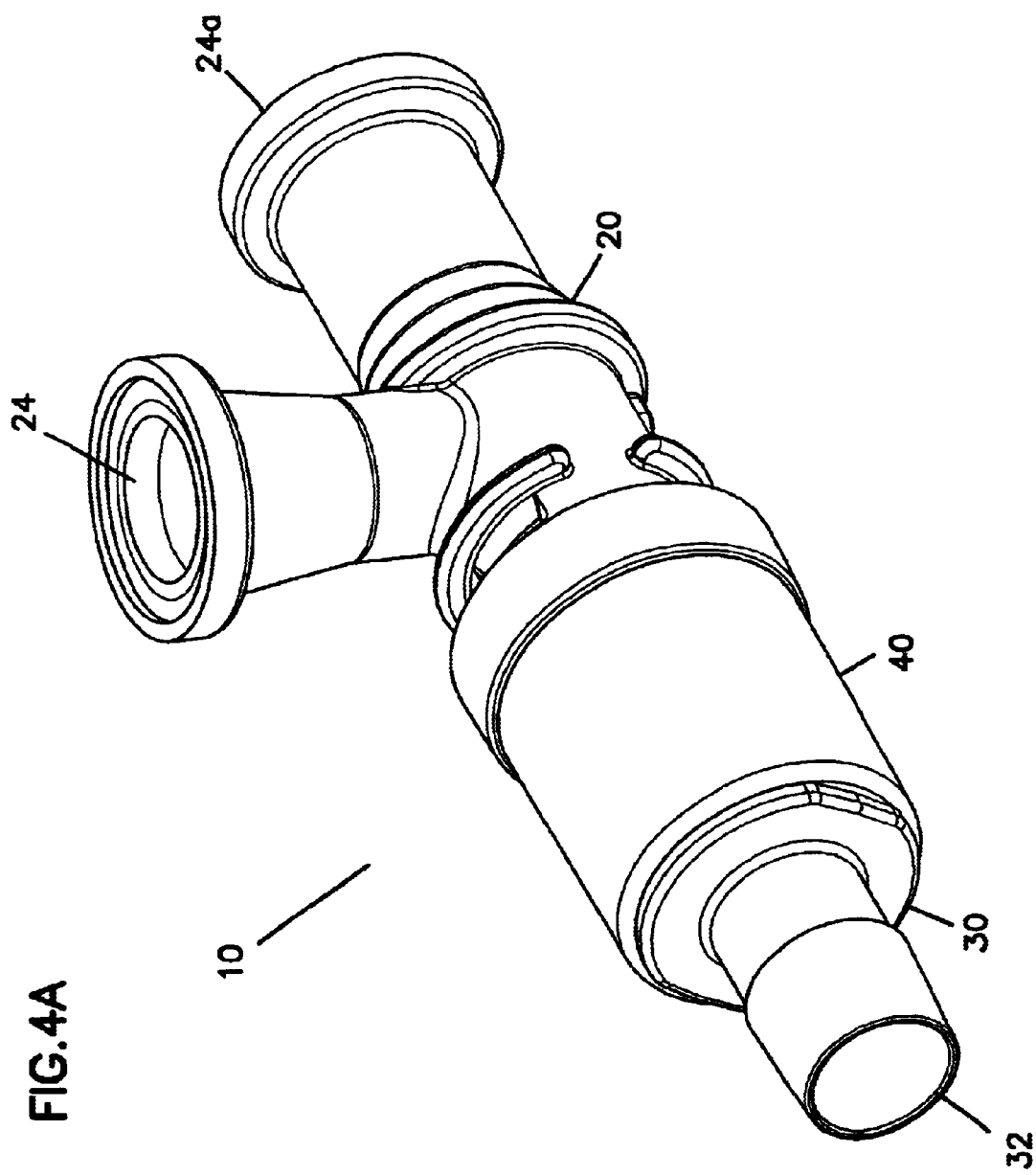

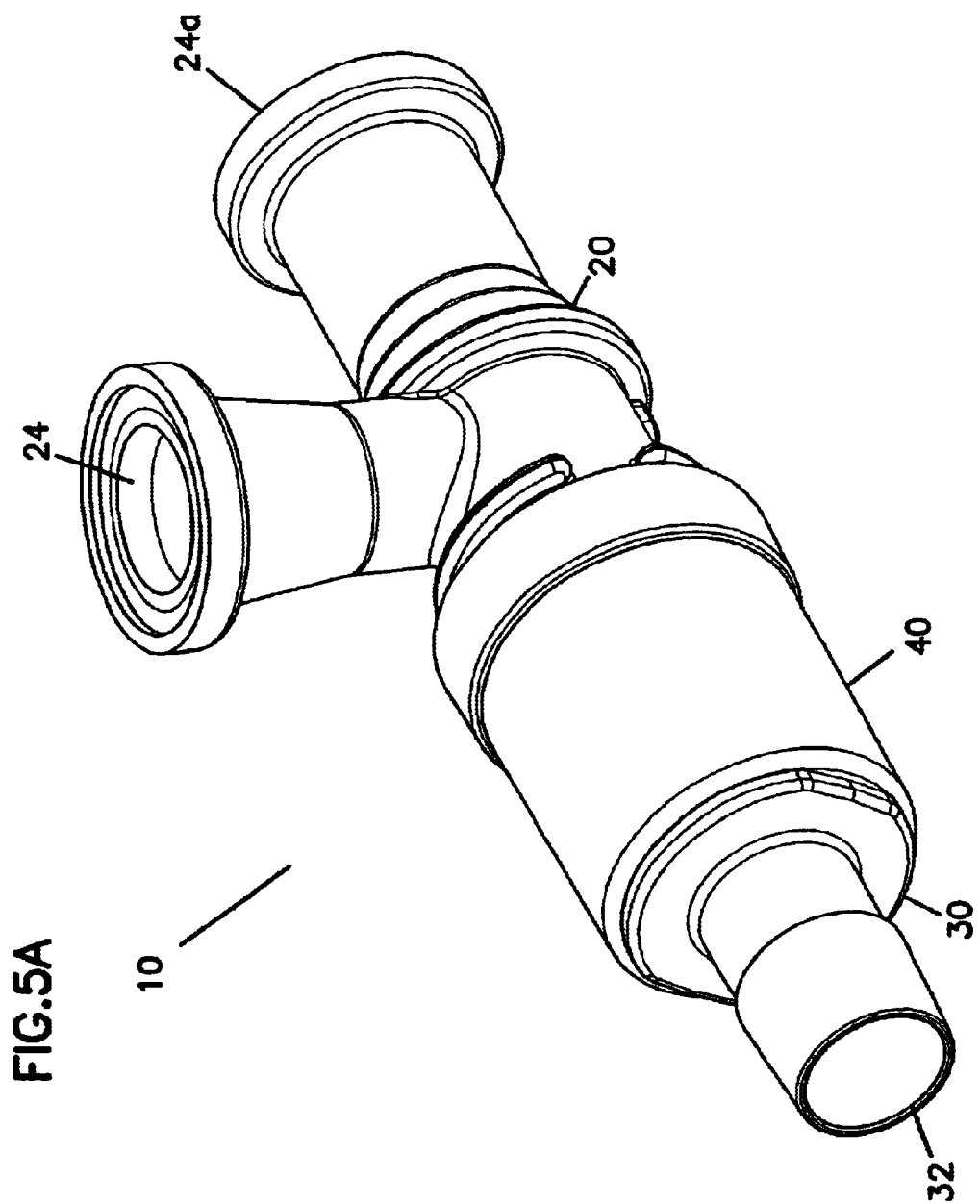

CONNECTOR APPARATUS WITH SEAL PROTECTOR AND METHOD OF THE SAME

FIELD OF THE INVENTION

This invention is generally related to a connector apparatus having a seal protector structure. More particularly, this invention is related to a connector apparatus having a coupler, and a mating valve telescopically connected with the coupler, where a sealing member disposed on the mating valve is protected by a planar member connected with the coupler when the mating valve passes by a transverse outlet.

BACKGROUND OF THE INVENTION

Connector devices employing a coupler and a telescoping mating valve are well known and widely used in many fluid conveyance and fluid dispensing applications. Typically, a coupler having an inlet and an outlet is connected with a mating valve that can be telescopically inserted into the coupler. The mating valve itself includes an inlet and an outlet, such that when the mating valve is inserted, the connector device can be actuated from a closed position to an open position where the outlets of both the coupler and the mating valve correspond or are otherwise aligned to enable fluid flow from the inlets toward and through the outlets. These devices will employ a sealing structure so as to create a fluid tight seal between the coupler and the mating valve during operation for preventing leakage. Such sealing structures usually are in the form of a resilient o-ring disposed at a position about the outer sidewall of the mating valve. Further, the outlets of these devices can be disposed in a direction transverse to the direction of the inlets and inserting direction of the mating valve into the coupler.

However, such devices where a mating valve passes an outlet transverse the direction of the inlet and transverse the direction of insertion of the mating valve, the sealing member residing on the mating valve can become displaced during activation or deactivation of the connector device. For instance, as the mating valve and sealing member pass over the area opening created by the outlet, the sealing member partially extrudes into the area opening. As the mating valve continues to be inserted into the coupler to open the connector device, the sealing member may peel or buckle as it attempts to reengage and reseal with the sidewall of the coupler due to the interference of the extruded sealing member. Such an event disrupts and compromises the sealing capability of the sealing member and can result in leakage and contamination of the fluids being conveyed.

Attempts have been made to resolve these problems. For instance, some devices may employ lubricants so that the mating valve and seal can move smoothly within the coupler and the seal can be maintained. While this solution may be possible, in applications requiring a sterile environment, such as in bioprocessing and fluid conveyance of the same, applying lubricants would not be desired or feasible for maintaining the seal when optimum sterile conditions are necessary. Other attempts have been made at providing a coupler having a radiused edge or border at its outlet so as to allow easy insertion of the mating valve past the outlet without comprising the sealing structures. However, such a structure for the outlet would likely need to be machined, as molding techniques do not yet support production of such an outlet. Further, if the outlet was machined, such a device would be more costly for production using more expensive materials, rather than inexpensive moldable plastics, which are a desired material for such connector devices, particularly disposable connector devices.

Therefore, there is a need to provide an improved connector device where the seal between a coupler and an inserting mating valve can be protected, while providing a durable cost effective apparatus suitable for a wide variety of fluid conveyance and fluid dispensing applications.

SUMMARY OF THE INVENTION

In accordance with the present invention, improvements have been made upon existing designs for protecting sealing structures used for creating a seal between a valve and a coupler in various connector devices. Particularly, improvements have been made to provide a structure to protect sealing members in these connector devices, where a valve member having the sealing member can easily pass across a transverse outlet in a coupler member during opening and closing of the connector device.

The present invention provides a connector apparatus having a planar member disposed on a coupler that is engageable with a sealing member of a mating valve member. The planar member protects the sealing member during activation or deactivation of the connector apparatus so that the seal is not damaged and is maintained both during and after use.

In one embodiment a connector apparatus includes a coupler being telescopically engageable with a mating valve. The coupler and the mating valve each include an inlet extending longitudinally therein and an outlet disposed at and through a sidewall thereof. The outlets extend in a direction transverse to the inlets. The coupler and the mating valve are in fluid communication with one another and the mating valve is telescopically insertable into the coupler such that the connector apparatus is actuatable from a closed position to an open position so as to enable fluid flow. The inlets and outlets define a flow passage therethrough such that the inlets correspond with each other and the outlets correspond with each other when the connector apparatus is in the open position. A sealing member is disposed about the sidewall at an end of the mating valve, and is proximate the outlet of the mating valve so as to provide a fluid tight seal between the mating valve and the coupler when telescopically engaged. A planar member is connected with the coupler and is disposed at a side defined by the outlet of the coupler. The planar member extends coaxially with the inlets and in a direction transverse to the outlets, wherein the planar member is engageable with the sealing member during activation of the connector apparatus into the open position and protects the seal member during activation into the open position.

In one embodiment, the planar member includes a first end, a second end and an elongated portion therebetween. The first end is proximate the connection between the coupler and the planar member. The elongated member extends toward the second end, where both the elongated member and the second end protrude and extend at least partially into an area opening created by the outlet of the coupler. Preferably, the planar member minimally protrudes into the area opening created by the coupler outlet.

In one embodiment, the planar member is defined by a rigid material having at least partially flexible and resilient structural characteristics. Preferably, the planar member has a width greater at its second end than its first end. More preferably, the planar member has a width tapering from a greater width at the second end toward a smaller width at the first end.

In one embodiment, the planar member is defined by a rigid material having at least partially flexible and resilient structural characteristics. Preferably, the planar member includes a thickness suitable for deflection from its original configuration when engaged with a sealing member of a mating valve, and suitable for returning to its original configuration when not engaged with a sealing member of a mating valve.

In one embodiment, the coupler and planar member are integrally molded as a one piece structure requiring no assembly. Preferably, the coupler and planar member are injection molded of a plastic material. Preferably, the mating valve is injection molded of a plastic material.

In yet another embodiment, a plurality of planar members are connected with the coupler and are disposed along a circumference defined by the outlet of the coupler. Each planar member extends parallel with the inlets and in a direction transverse to the outlets, wherein at least one planar member is engageable with the seal member of the mating valve during activation of the connector apparatus into the open position and at least one planar member is engageable with the seal member during deactivation of the connector apparatus into the closed position. The planar member protects the seal member during activation or deactivation of the connector apparatus. Preferably, a first planar member and a second planar member are generally oppositely disposed and connected with the coupler as above. The first planar member is engageable with the sealing member and protects the sealing member during activation of the connector apparatus in the open position. The second planar member is engageable with the sealing member and protects the sealing member during deactivation of the connector apparatus in the closed position.

The present invention provides a connector apparatus where a sealing member can be suitably protected when a mating valve passes an outlet. The planar member of the present invention prevents peeling or buckling of a seal, such as but not limited to a resilient o-ring, in the event the seal extrudes into the outlet thereby displacing the seal and protects the seal integrity between the coupler and the mating valve from being compromised. As the planar member described above provides protection of a seal during actuation and during deactivation, the need for lubricants to protect and maintain the seal can be eliminated. The present invention further provides a dry seal that is suitably protected and maintained, and is also favorable for applications needing a sterile environment. The planar member(s) protrude minimally into the area opening created by the outlet, so that fluid flow generally is not obstructed or hindered. Further, the planar member(s) can be integrally molded with the coupler as a one piece structure, requiring no assembly and providing a cost effective device.

A variety of additional advantages and objects of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

Referring now to the drawings in which like reference numbers represent corresponding parts throughout:

FIG. 1C represents a side sectional view of the connector apparatus of FIG. 1A taken from line A—A of FIG. 1B and showing the seal protector in section.

FIG. 2A represents an elevational perspective view of one embodiment of a coupler from FIG. 1A in accordance with the principles of the present invention.

FIG. 2B represents an elevational top view of the coupler of FIG. 2A and also illustrating the seal protector.

FIG. 2D represents a side sectional view of the coupler of FIG. 2A taken from line B—B of FIG. 2B and also illustrating the seal protector of FIG. 2B.

FIG. 3A represents an elevational perspective view of one embodiment of a mating valve from FIG. 1A in accordance with the principles of the present invention.

FIG. 4A represents a perspective elevational view of the connector apparatus of FIG. 1A according to the principles of the present invention and illustrating the coupler and the mating valve telescopically engaged where the connector apparatus is in a partially open position.

FIG. 5A represents a perspective elevational view of the connector apparatus of FIG. 1A according to the principles of the present invention and illustrating the coupler and the mating valve telescopically engaged where the connector apparatus is in a second partially open position.

DETAILED DESCRIPTION OF THE PREFERRED EMBODIMENT

In the following description of the illustrated embodiments, reference is made to the accompanying drawings that form a part hereof, and in which is shown by way of illustration of the embodiments in which the invention may be practiced. It is to be understood that other embodiments may be utilized as structural changes may be made without departing from the spirit and scope of the present invention.

Figure 1A:
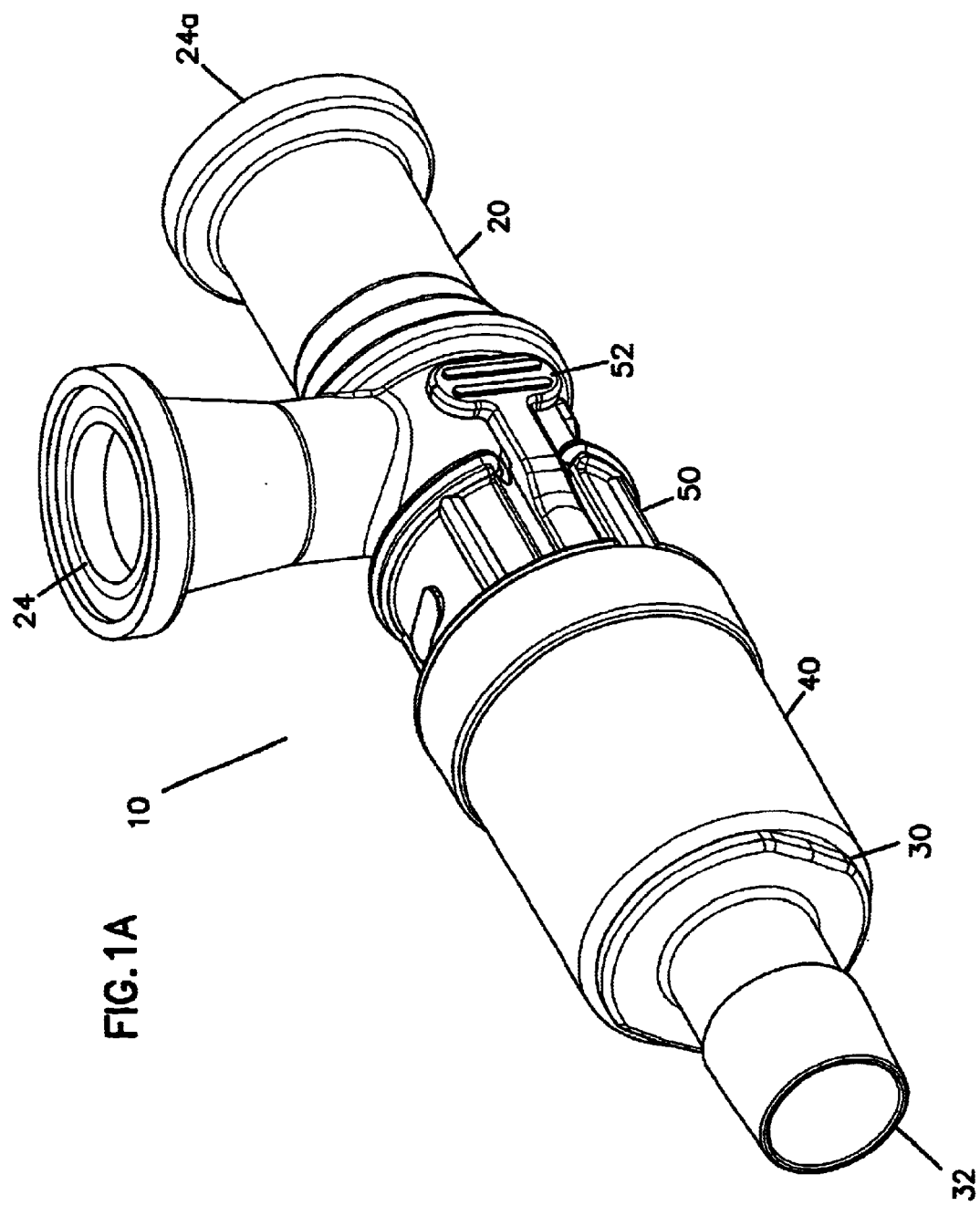
FIG. 1A represents a perspective elevational view of one embodiment of a connector apparatus in accordance with the principles of the present invention.
Figure 1B:
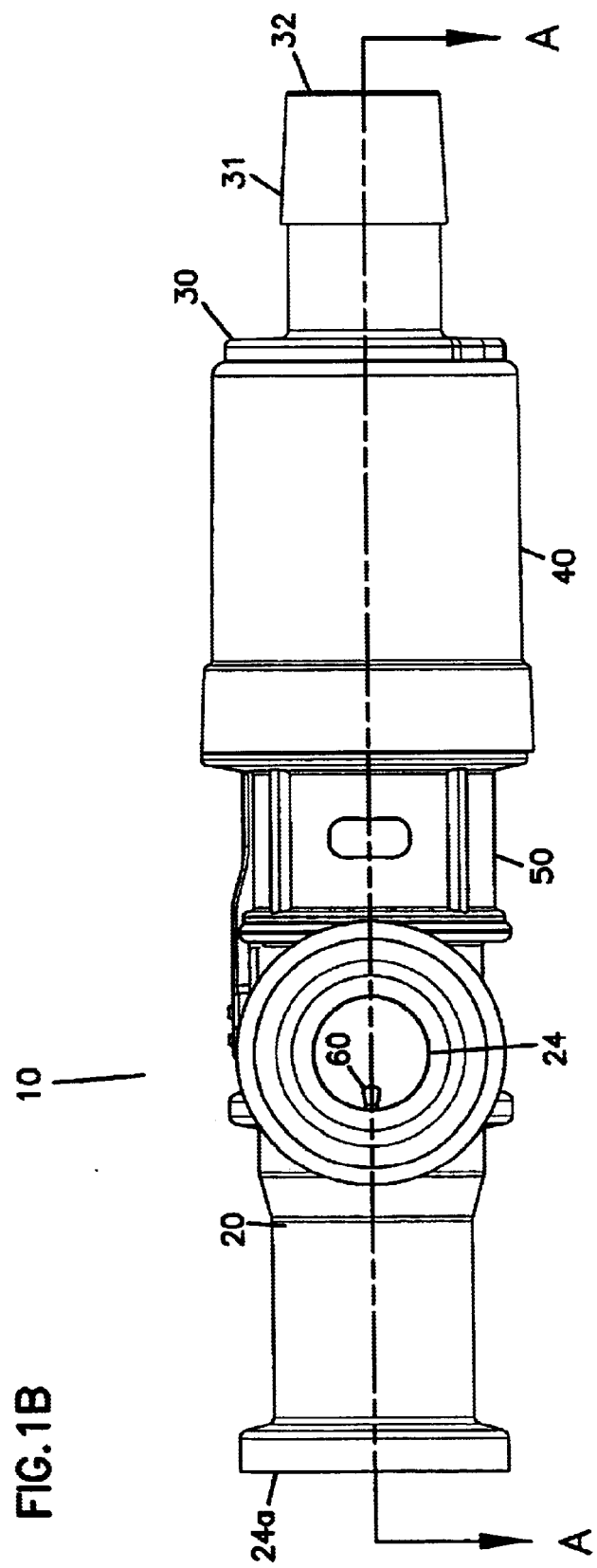
FIG. 1B represents a top elevational view of the connector apparatus of FIG. 1A illustrating one embodiment of a seal protector in accordance with the principles of the present invention.

FIGS 1A–1C illustrate one exemplary embodiment of a connector apparatus 10 having a coupler 20 that is moveably connected with a mating valve member 30. Preferably, the coupler 20 and the mating valve member 30 are telescopically engaged and movable relative to one another. An adapter 40 may be connected with the valve member 30 to secure the valve member 30 to the coupler 20 when they are connected in both an open and a closed position of the connector apparatus 10. The coupler 20 and the valve member 30 also may be releasably connected. A stop member 50 is releasably attached between one end of the adapter 40 and an outlet 24 of the coupler. The stop member 50 may be released by using the handle 52 to tear away the stop member, so as to enable telescopic movement of the valve member 30 and adapter 40 relative to the coupler 20 and toward the coupler outlet 24 from the closed position to an open position of the connector apparatus 10.

The coupler 20 and the valve member 30 each include an inlet 22, 32 and an outlet 24, 34 in fluid communication with each other, and defining flow passages 25, 35 therebetween when the connector apparatus 10 is in the open position. The inlets 22, 32 extend longitudinally respectively into each of the coupler 20 and the valve member 30. The outlets 24, 34 respectively are disposed at and through sidewalls of the coupler 20 and the valve member 30. The outlets 24, 34 extend in a direction transverse to the direction of the inlets 22, 32. At least one sealing member 36 is disposed about the sidewall of the valve member 30, and preferably is proximate the outlet 34. The sealing member 36 provides a fluid tight seal between the mating valve member 30 and the coupler 20 when telescopically engaged. When the valve member 30 is telescopically inserted further into the coupler 20, the outlets 24, 34 align to place the connector apparatus 10 in the open position.

At the outlet 24 of the coupler 20, a seal protector is disposed at a side defined by the outlet 24 and is constructed and arranged as a planar member 60. The planar member 60 is connected with the coupler 20 and extends coaxially with the inlets 22, 32. The planar member 60 extends in a direction transverse to the direction of the outlets 24, 34. The planar member 60 is engageable with the sealing member 36 when the mating valve member 30 is telescopically moved into the coupler such that the sealing member 36 contacts the planar member during activation or deactivation of the connector apparatus 10. FIGS. 2A–2E, below, best illustrate the coupler 20 and planar member 60.

Figure 2C:
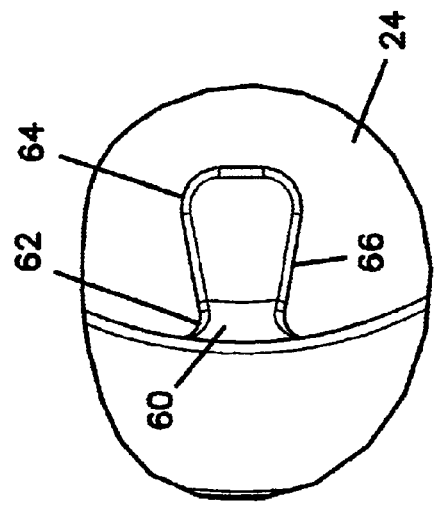
FIG. 2C represents a partial top view of the coupler of FIG. 2A illustrating an enlarged top view of the seal protector from FIG. 2B.
Figure 2E:
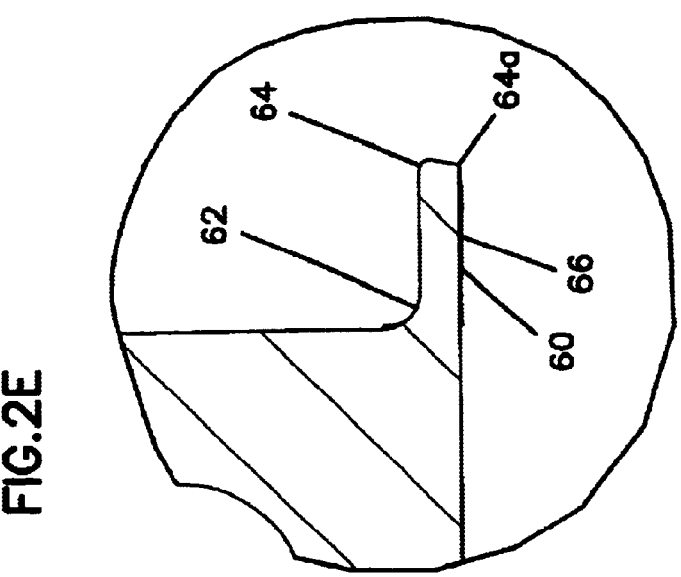
FIG. 2E represents a partial side sectional view of the coupler of FIG. 2A taken from line B—B of FIG. 2B illustrating an enlarged view of the seal protector.

FIGS. 2A, 2B and 2D illustrate views of the coupler 20 individually and showing the planar member 60 (2B and 2D) similarly as in FIGS. 1B–1C. The coupler may also include at least one secondary opening such as 24a that can provide a flushing feature for flushing through the outlet 24 out the opening 24a. As shown in FIGS. 2C and 2E, the planar member 60 includes a first end 62, a second end 64 and an elongated portion 66 therebetween. The first end 62 is proximate a point of connection between the coupler 20 and the planar member, at the side defined by the outlet 24. The elongated member 66 extends toward the second end 64, where both the elongated member 66 and the second end 64 protrude and extend into an area opening created by the outlet 24. Preferably, the planar member 60 minimally protrudes into the area opening created by the coupler outlet 24.

Preferably, the planar member 60 defines a width at the second end 64 that is greater than a width at the first end 62. More preferably, the planar member 60 defines a tapering width that increases from the first end 62, through the elongated portion 66 and to the second end 64. Preferably, the width tapers from about 0.040 inches at the first end 62 to 0.90 inches at the second end 64. It will be appreciated that a variety of width values and ranges could be used as needed to provide suitable protection of the sealing member 36.

The planar member 60 defines a thickness such that the planar member 60 can be somewhat deflected when in contact and engaged with the sealing member 36 and return to its original configuration when not engaged with the sealing member 36 during activation or deactivation of the connector apparatus 10. Preferably, the planar member 60 has a thickness that is about 0.020 inches. The thickness of the planar member can also be tapered to a smaller thickness toward the second end 64 to allow for more flexibility as needed for engaging the sealing member 36. It will be appreciated that the planar member 60 may have a thickness that can vary as needed to retain its resiliency and to provide suitable protection of the sealing member 36. Further, the thickness may be varied as allowed by conventional molding techniques, while still achieving complete fill of the feature during molding. The planar member 60 also may include a tapered edge 64a at the second end 64, where the tapered edge 64a extends in toward the elongated portion from a top of the planar member 60 to the bottom of the same. This configuration provides a ramp surface that helps prevent the sealing member, during activation/deactivation, from passing over the planar member 60 and causing the planar member to deflect downward.

As illustrated, only one planar member is shown. It will be appreciated that the coupler may be formed with a plurality of planar members connected with the coupler and disposed along a circumference defined by the outlet of the coupler. Each planar member extends parallel with the inlets and in a direction transverse to the outlets, wherein at least one planar member is engageable with the seal member of the mating valve during activation of the connector apparatus into the open position and at least one planar member is engageable with the seal member during deactivation of the connector apparatus into the closed position. The planar member protects the seal member during activation or deactivation of the connector apparatus. Preferably, a first planar member and a second planar member may be generally oppositely disposed and connected with the coupler as above. The first planar member is engageable with the sealing member and protects the sealing member during activation of the connector apparatus in the open position. The second planar member is engageable with the scaling member and protects the sealing member during deactivation of the connector apparatus in the closed position.

The coupler 20, mating valve member 30 and adapter 40 are formed of a rigid material, preferably formed of an injection molded plastic material, such as polysulfone. Further, the planar member 60 also is formed of a rigid material as the coupler 20. Preferably, the coupler 20 and the planar member 60 are molded as a single one-piece structure that is injection molded and requires no assembly. It will be appreciated that other suitable materials may be used for forming the connector apparatus 10. The planar member 60 is constructed and arranged with the thickness and width dimensions to allow the planar member 60 to have partially flexible and resilient properties so that the planar member 60 can be deflected during activation or deactivation of the connector apparatus 10. The planar member 60 provides a seal protective structure such that the sealing member 36 does not peel or buckle and protects the sealing member from being compromised allowing for smooth movement past the transverse outlet 24 of the coupler. The planar member 60 reduces contact of the sealing member 36 against a corner edge created by the transverse coupler outlet 24.

Figure 3B:
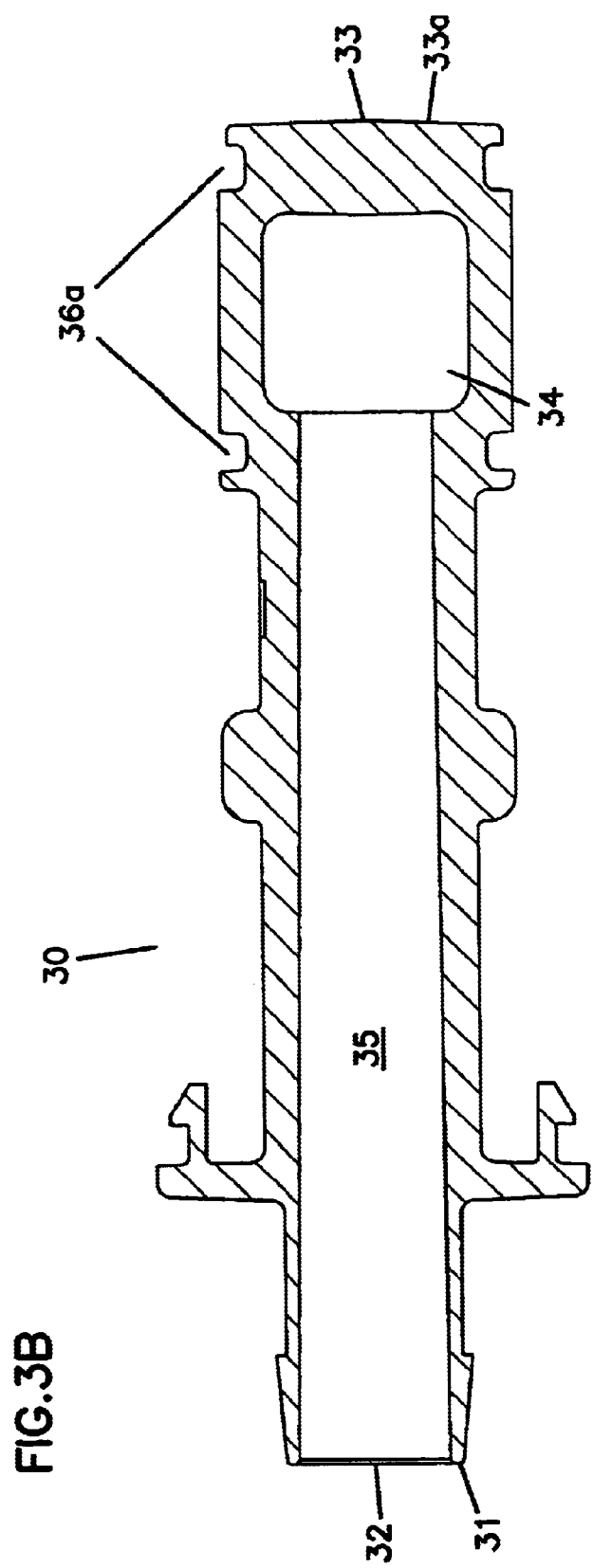
FIG. 3B represents an elevational top view of the mating valve of FIG. 3A.

FIGS. 3A–3B illustrate individual views of the mating valve member 30. Similarly as shown in FIGS. 1A–C, the mating valve member 30 includes a first end 31 and a second end 33. The first end 31 defines an inlet 32 and the inlet 32 extends longitudinally therein. An outlet 34 is defined proximate the second end 33, where the outlet 34 extends in a direction transverse to the direction the inlet 32 extends. At least one groove 36a is disposed about the outer sidewall and proximate the second end 33 and outlet 34. The grove 36a provide a position where the sealing members 36 can be connected. Preferably, the sealing members 36 are resilient o-ring structures fitted around the outer sidewall of the mating valve member 30 and provide the fluid tight seal between the coupler 20 and the mating valve member 30. The inlet 32 and outlet 34 define a flow passage 35 therebetween that is in fluid communication with the flow passage 25 of the coupler 20. A front end surface 33a at the second end prevent flow through the valve member 30 to the secondary opening 24a of the coupler 20.

FIGS. 4A–6C illustrate different positions of telescopic engagement between the coupler 20 and the mating valve member 30, and the relationship of the planar member 60 with respect to the sealing member 36, particularly during activation of the connector apparatus.

Figure 4B:
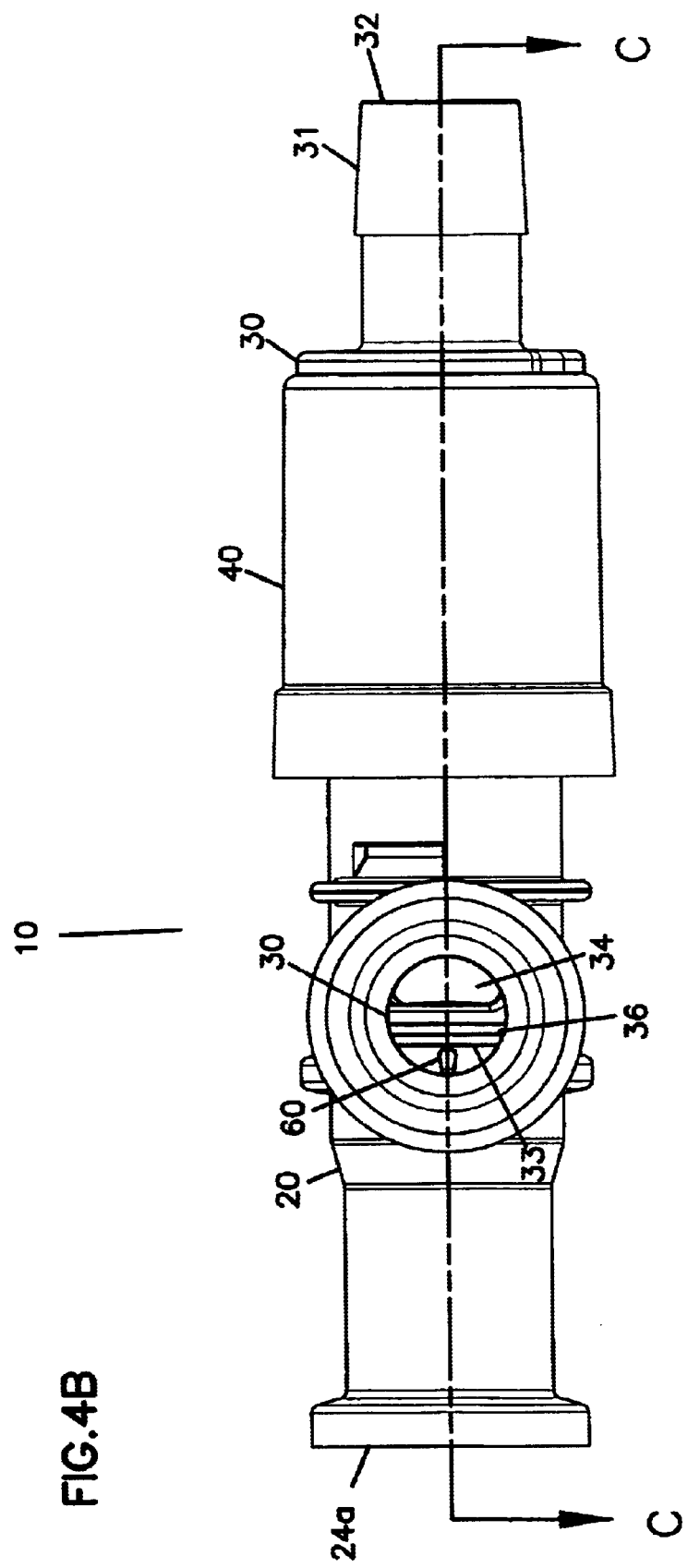
FIG. 4B represents a top elevational view of the connector apparatus of FIG. 1A and illustrating the coupler and the mating valve telescopically engaged where the connector apparatus is in a partially open position.
Figure 4C:
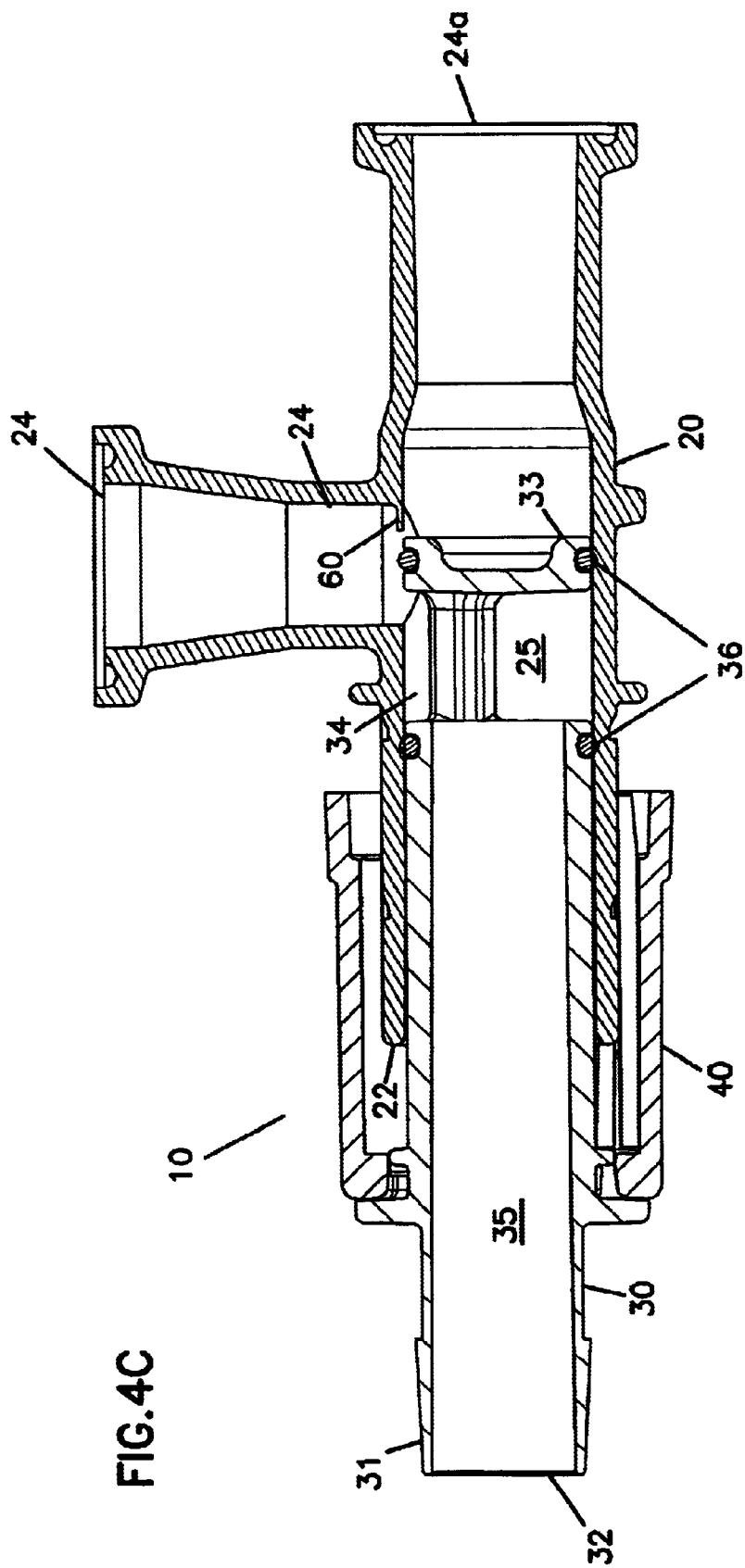
FIG. 4C represents a sectional view of the of the connector apparatus of FIG. 1A taken from line C—C from FIG. 4B and illustrating the coupler and the mating valve telescopically engaged where the connector apparatus is in a partially open position.

FIGS. 4A–4C show the connector apparatus 10 with the stop portion removed and the coupler 20 and mating valve member 30 telescopically engaged in a first partially open position. Particularly, the sealing member 36 is shown at a position just before contact with the planar member 60.

Figure 5B:
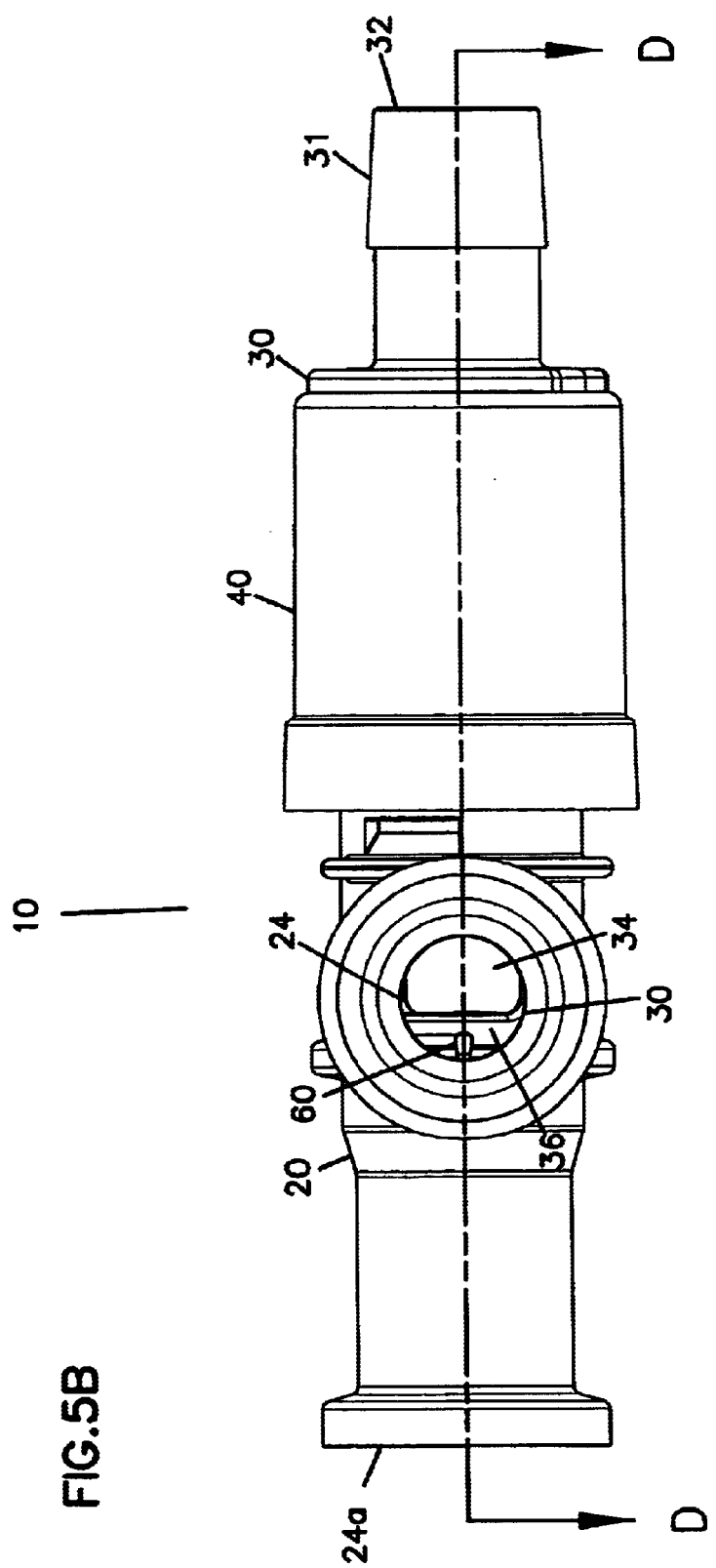
FIG. 5B represents a top elevational view of the connector apparatus of FIG. 1A and illustrating the coupler and mating valve telescopically engaged where the connector apparatus is in the second partially open position.
Figure 5C:
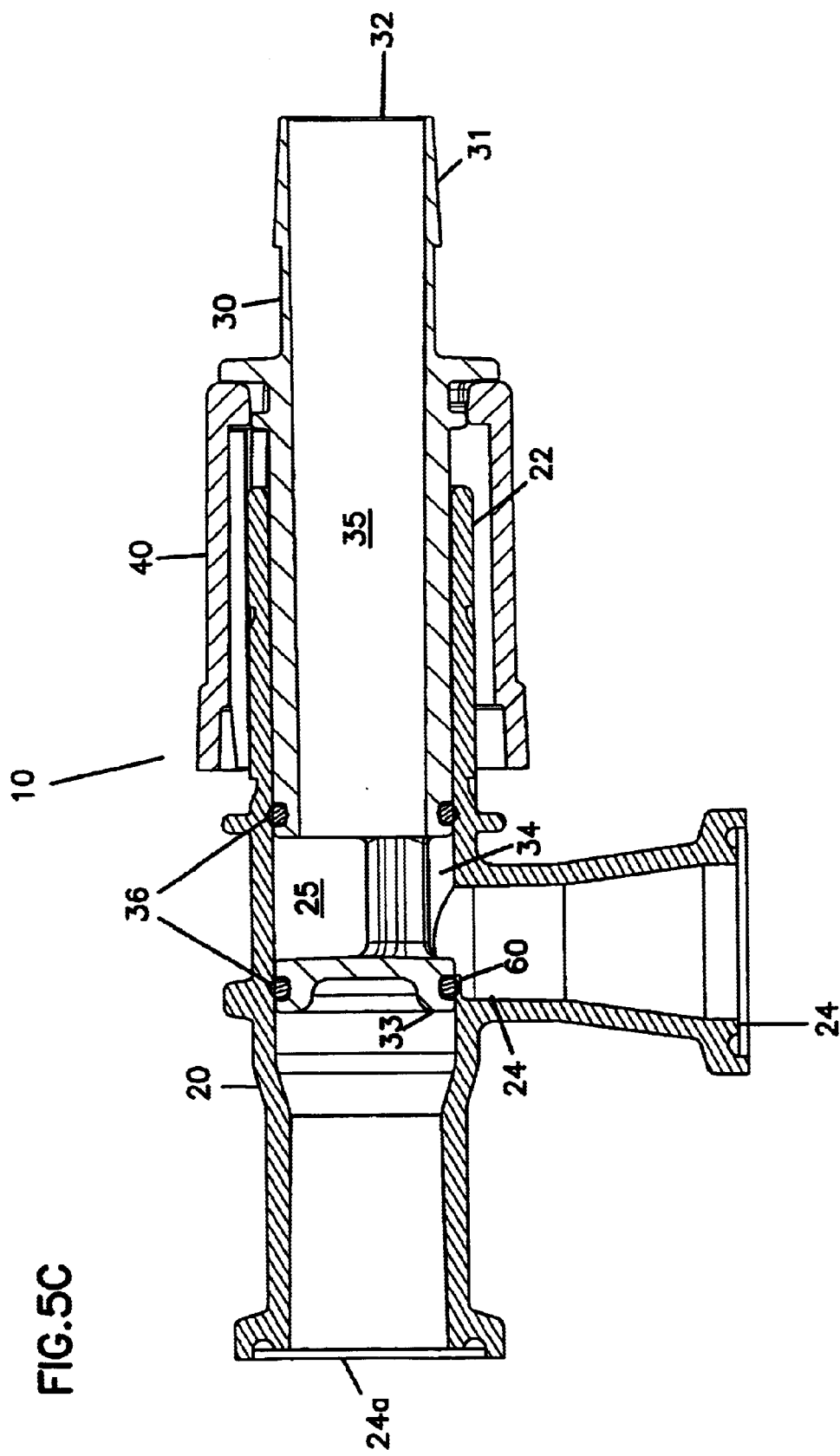
FIG. 5C represents a side sectional view of the connector apparatus taken from line D—D of FIG. 5B and illustrating the coupler and the mating valve telescopically engaged where the connector apparatus is in the second partially open position.

FIGS. 5A–5C show the connector apparatus 10 with the coupler 20 and the mating valve member 30 further telescopically engaged in a second partially open position. Particularly, the scaling member 36 is shown in contact with the planar member 60. The planar member 60 enables the sealing member 36 to smoothly pass under the planar member 60 during activation of the connector apparatus 10 and prevent the sealing member 36 from buckling, peeling or otherwise causing the sealing member to be compromised.

Figure 6A:
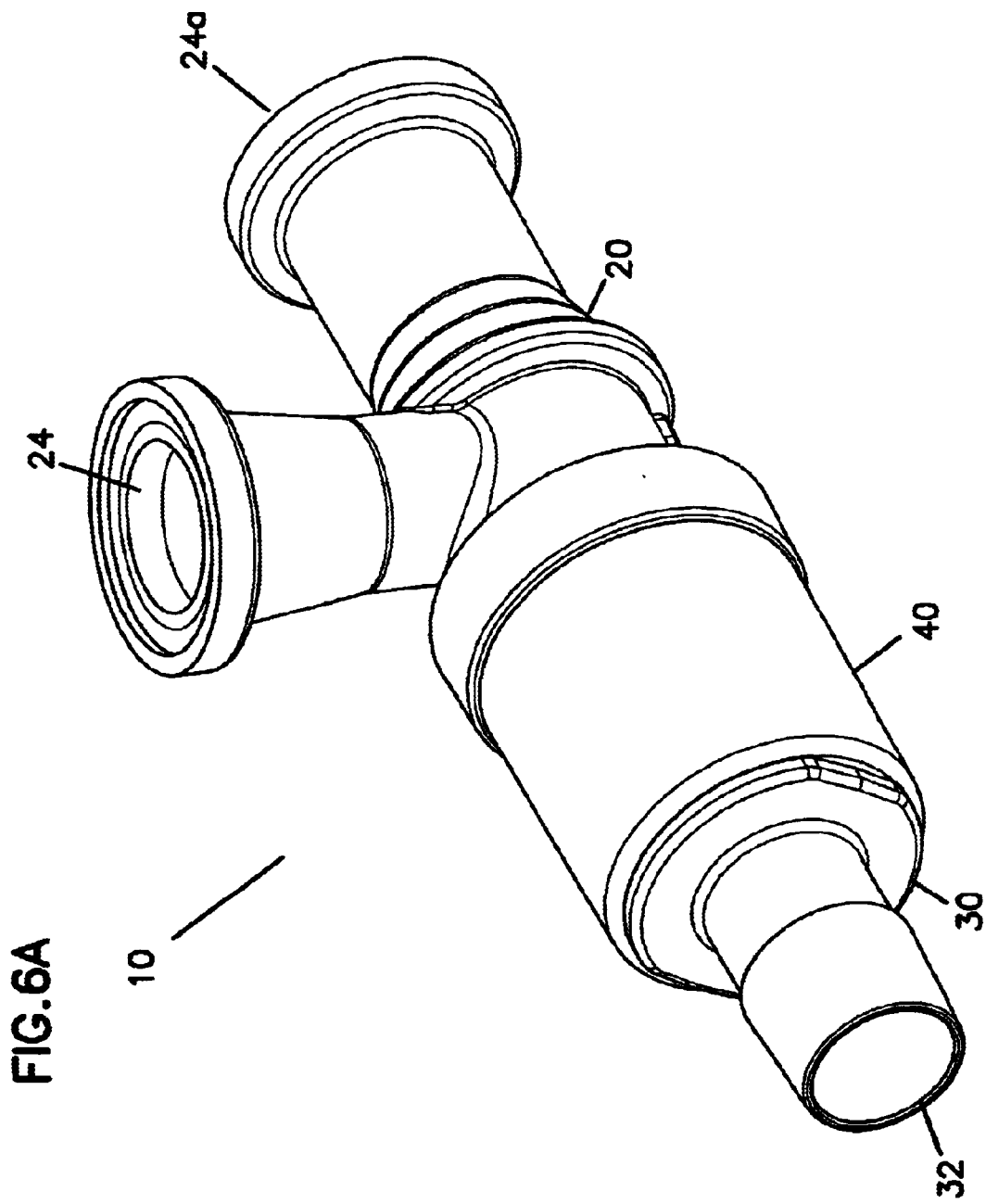
FIG. 6A represents a perspective elevational view of the connector apparatus of FIG. 1A according to the principles of the present invention and illustrating the coupler and the mating valve telescopically engaged where the connector apparatus is in a fully opened position.
Figure 6B:
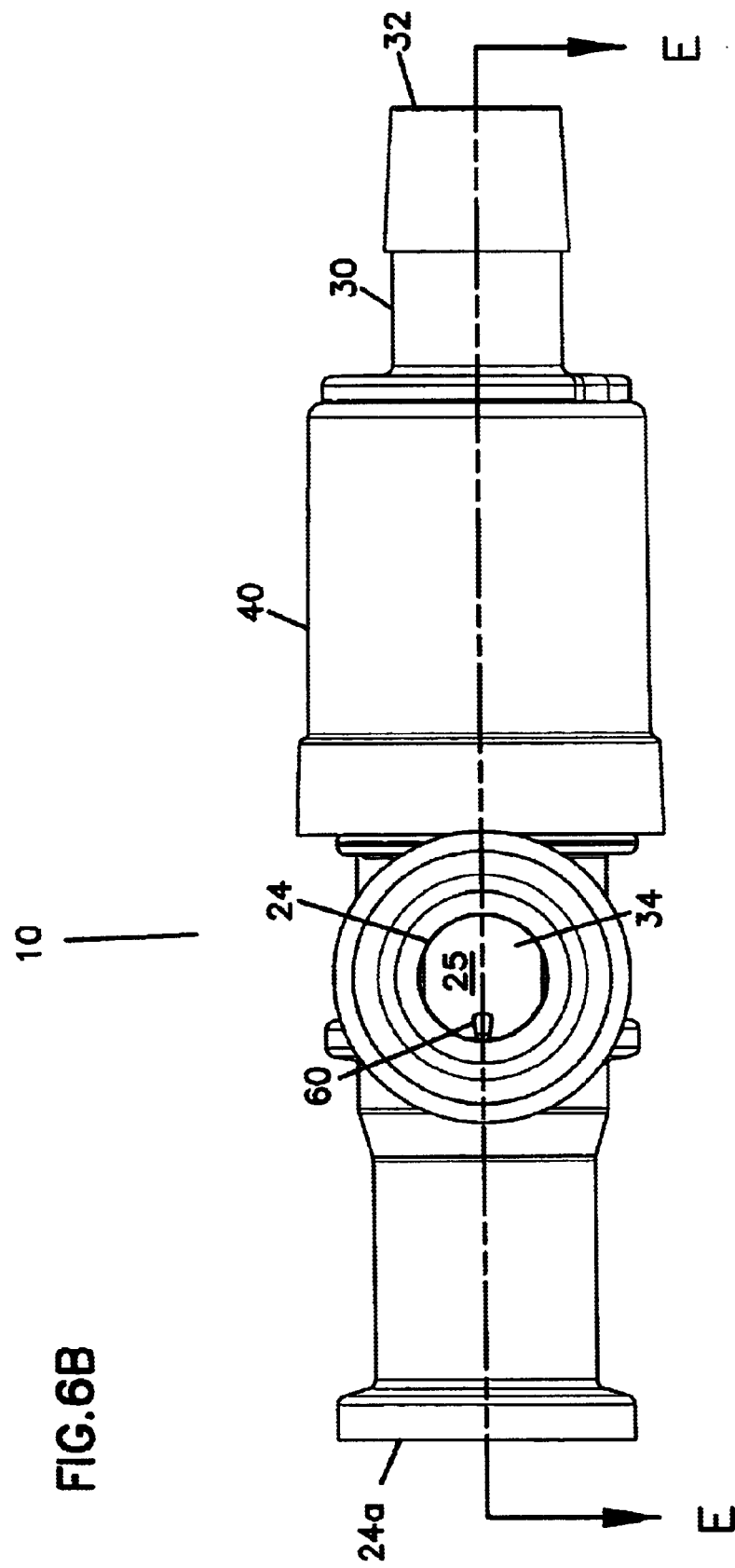
FIG. 6B represents a top elevational view of the connector apparatus of FIG. 1A and illustrating the coupler and mating valve telescopically engaged where the connector apparatus is in the fully opened position.
Figure 6C:
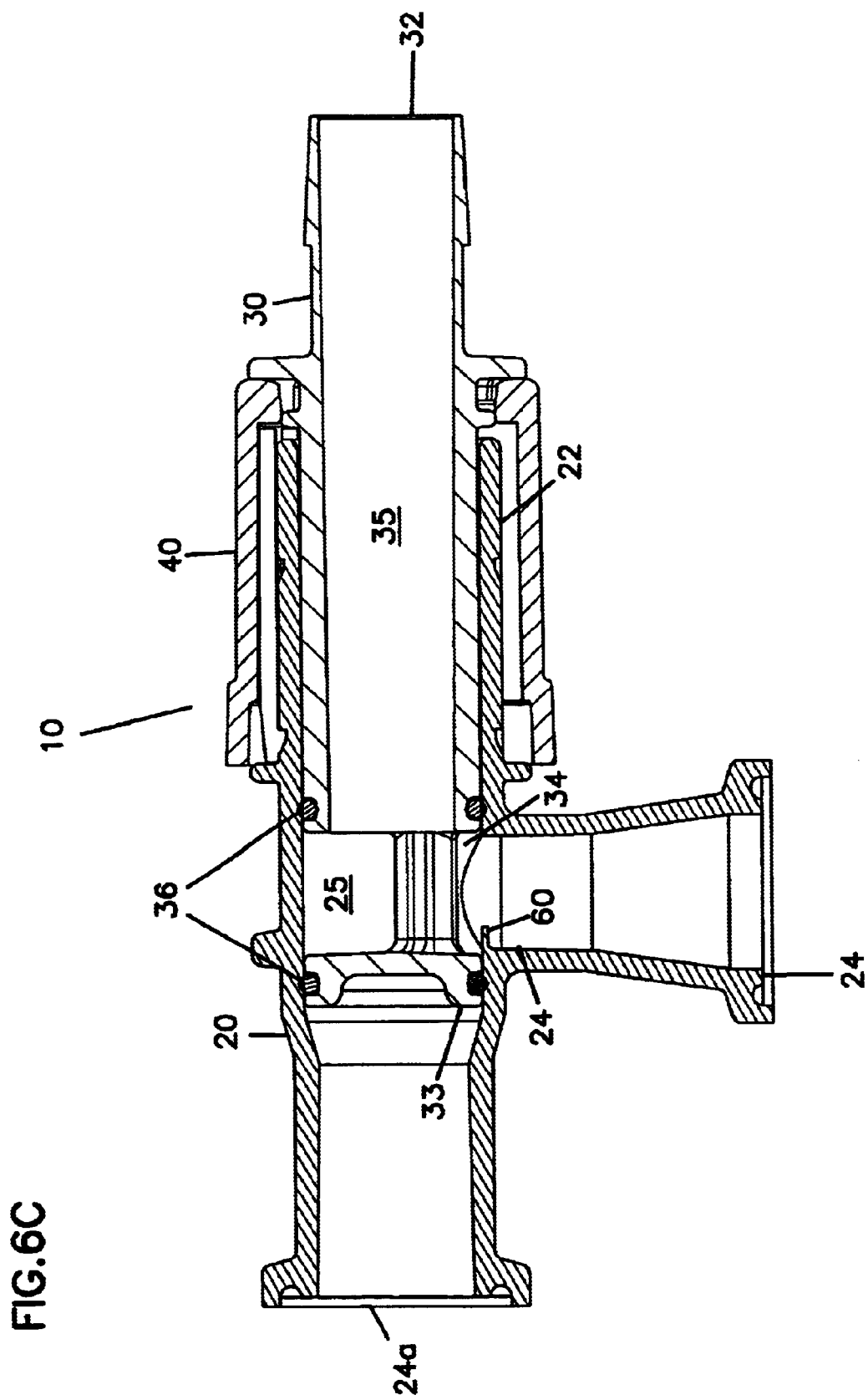
FIG. 6C represents a side sectional view of the connector apparatus taken from line E—E of FIG. 6B and illustrating the coupler and the mating valve telescopically engaged where the connector apparatus is in the second partially open position.

FIGS. 6A–6C show the connector apparatus with the coupler 20 and the mating valve member 30 still further telescopically engaged where the connector apparatus 10 is in a fully activated open position. The sealing member 36 continues to provide a fluid tight seal between the coupler 20 and the mating valve member 30.

Figure 7:
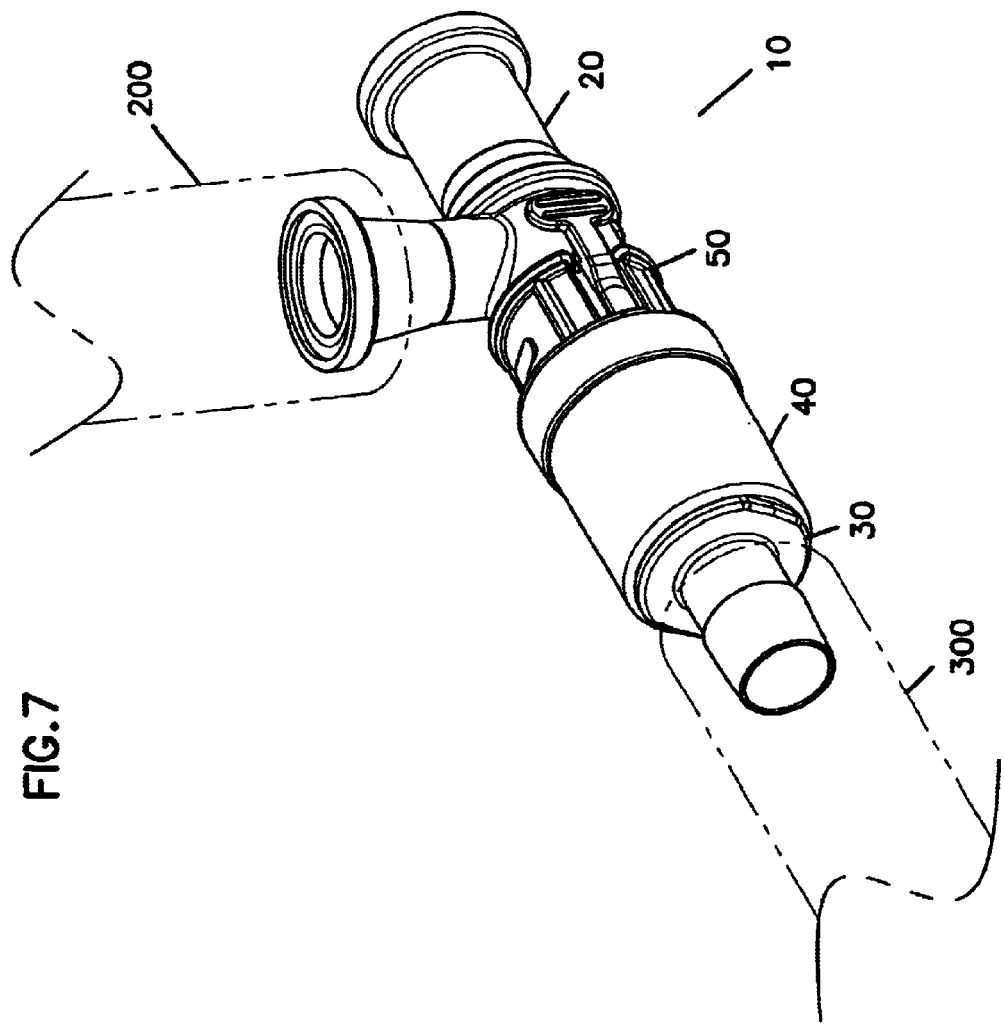
FIG. 7 represents the connector apparatus of FIG. 1A illustrating the connector apparatus adapted with a fluid source and a fluid system.

FIG. 7 illustrates the connector apparatus 10 being connectable to a fluid source, schematically shown as 300. The connector apparatus 10 also is connectable with a fluid system, such as a fluid line schematically shown as 200.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A connector apparatus, comprising:

a coupler being telescopically engageable with a mating valve; said coupler and said mating valve each including an inlet extending longitudinally therein and each including an outlet disposed at a sidewall thereof; said outlets extending in a direction transverse to said inlets; said coupler and said mating valve being in fluid communication with one another and said mating valve being telescopically insertable into said coupler such that said connector apparatus is actuatable from a closed position to an open position; said inlets and outlets defining a flow passage therethrough where said inlets correspond with each other and said outlets correspond with each other when said connector apparatus is in said open position;

a sealing member is disposed about said sidewall and proximate said outlet of said mating valve so as to provide a fluid tight seal between said mating valve and said coupler when telescopically engaged; and a seal protector is connected with said coupler and is disposed at a side defined by said outlet of said coupler; said seal protector is a planar member extending in a direction that is coaxial with said inlets and in a direction transverse to said outlets;

wherein said seal protector is engageable with said seal member during actuation of said connector apparatus into said open position and protects said seal member during actuation into said open position.

2. The connector apparatus according to claim 1, wherein said seal protector extends at least partially into an area opening defined by said outlet of said coupler.

3. The connector apparatus according to claim 1, wherein said seal protector defining first and second ends with an elongated member therebetween, said first end is proximate and connected with said side of said coupler outlet and said elongated portion and second end extending from said first end.

4. The connector apparatus according to claim 3, wherein said second end of said seal protector defines a width greater than a width of said first end of said seal protector.

5. The connector apparatus according to claim 3, wherein said second end of said seal protector defines a width greater than a width of said first end of said seal protector where said width increasingly tapers from said first end to said second end.

6. The connector apparatus according to claim 1, wherein said seal protector is made of a rigid material, whereby said seal protector being constructed and arranged to be at least partially flexible and resilient.

7. The connector apparatus according to claim 1, wherein said coupler and seal protector being integrally molded as a one piece structure requiring no assembly.

* * * * *